United States Patent Office 3,522,389
Patented July 28, 1970

3,522,389
MASKED FILM RECORDING ELECTROLUMINES-
CENT DIODE LIGHT SOURCE HAVING A
TRANSPARENT FILLED MASK APERTURE
Donald R. Bumiller, Winchester, Mass., assignor, by
mesne assignments, to Norton Research Corporation
Filed Dec. 6, 1966, Ser. No. 599,638
Int. Cl. G11b 7/18; G01d 9/42; H05b 33/00
U.S. Cl. 179—100.3                          3 Claims

ABSTRACT OF THE DISCLOSURE

An electroluminescent diode is employed which has a mask defining a narrow light-transmitting slit secured to one surface of the diode; the light entering the mask from the diode may be diffused.

---

This invention relates to a camera for recording sound or other data on a photographic film, the camera embodying an electroluminescent junction diode as the light source.

The principal object of the present invention is to provide a camera capable of high audio frequency response.

Another object of the invention is to provide a camera capable of producing extremely small, closely-spaced, discrete, exposed areas on a photographic film by using an electroluminescent diode having a precisely controlled light-emitting area.

Still another object of the invention is to provide an improved electroluminescent junction diode.

These and other objects of the invention will be obvious and will in part appear hereinafter.

The invention accordingly comprises the apparatus possessing the construction, combination of elements and arrangemement of parts which are exemplified in the following detailed disclosure and the scope of the application of which will be indicated in the claims.

For a fuller understanding of the nature and objects of the invention, reference should be had to the following detailed discussion thereof taken in connection with the accompanying drawings in which.

SUMMARY OF THE INVENTION

The present invention is particularly concerned with a means for recording data, such as sound on a photographic film, by projecting light from an electroluminescent diode onto the surface of the film. For recording high frequency sound and for placing a great deal of information on a small amount of film, it is essential that the light be emited from the diode in a very small, carefully defined, area. In the present invention, the light-emitting area of the diode is defined by an opaque mask surrounding a transparent surface of the diode. This mask is supported on the surface by a layer which is at least translucent and preferably transparent and is preferably an insulating layer. In one aspect of the invention, this insulating layer is an adhesive layer which serves to adhesively secure a metallic foil, having a masked aperture therein, to the surface of the diode.

In another embodiment of the invention, the supporting layer is an insulating layer, preferably translucent, on which a suitable mask is deposited by vapor deposition techniques.

In order that the invention may be more fully understood, reference should be had to the drawings taken in connection with the accompanying specific examples.

Figure 1:
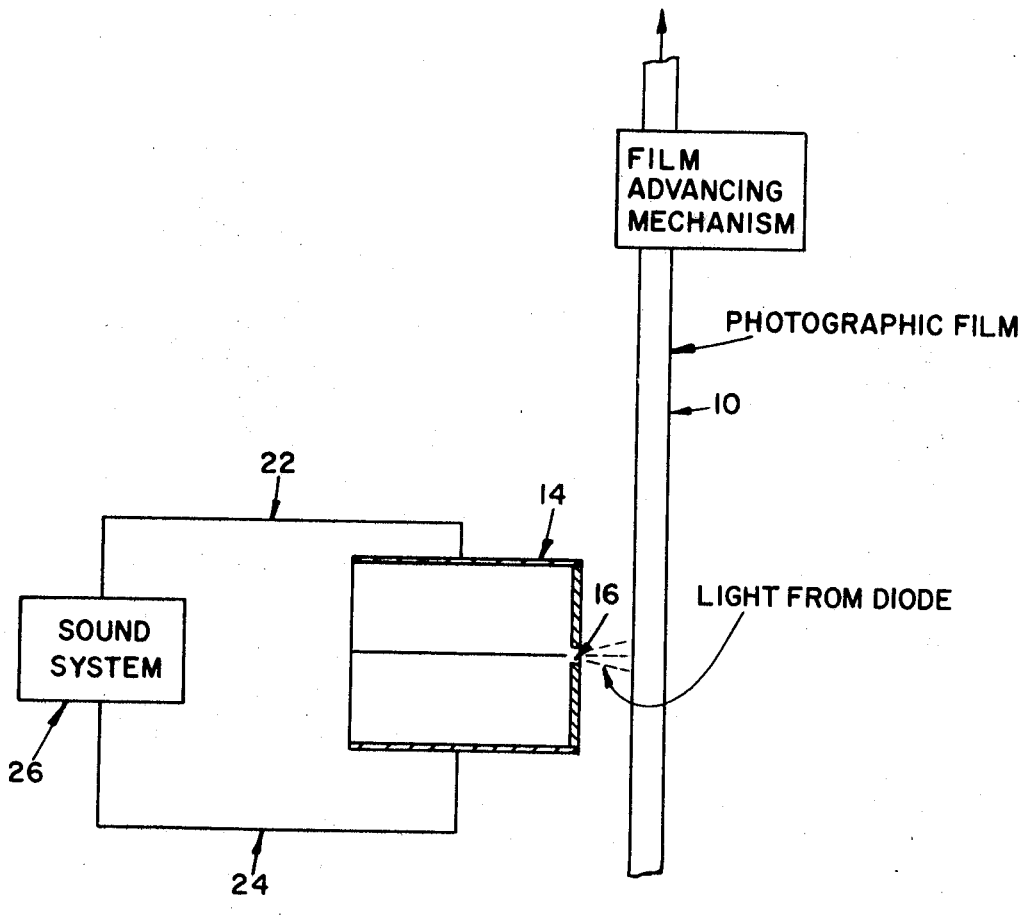
FIG. 1 is a diagrammatic, schematic view of a camera embodying the invention.

In FIG. 1 there is illustrated a camera having a photosensitive film 10 arranged to be advanced by a suitable advancing mechanism 12 past a light-emitting diode 14. This diode 14 has a light-emitting slit 16 which directs light to the film 10. Current leads 22 and 24 feed a modulated electrical signal to the diode from sound system 26.

Figure 2:
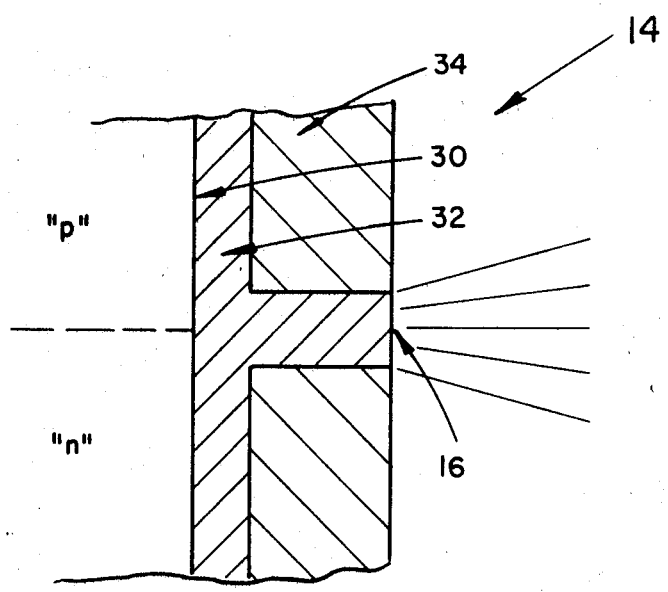
FIG. 2 is a diagrammatic, schematic, enlarged, sectional view of one preferred form of diode of the present invention.

Referring now to FIG. 2, there is shown in greater detail a preferred type of diode particularly useful in the combination shown in FIG. 1. In this preferred arrangement, the diode consists of a single crystal, preferably formed of silicon carbide, having "p" and "n" regions 28 and 29, respectively. One edge 30 of the diode perpendicular to the plane of the "p-n" junction can be highly polished, or can be formed with a matte surface to provide a diffused light-emitting area. Adjacent this surface there is provided a layer of adhesive 32 which adhesively secures metallic mask 34 to the edge of the diode, the adhesive holding the metallic mask 34 out of electrical contact with the diode to prevent shortage by the metallic mask 34 of the diode. The light-emitting slit 16 is lined up approximately with the plane of the "p-n" junction. However, when the light emitted from the edge 30 is a diffused light (e.g. surface 30 is matte) exact alignment of the slit 16 with the "p-n" junction is not essential but still preferred. In a preferred embodiment, the adhesive 32, which is transparent or translucent, fills the slit 16 to make a smooth outer surface which will not collect dirt or pieces of photosensitive emulsion in the event the mask contacts the film surface.

While one specific embodiment of the invention has been shown in FIG. 2 wherein an adhesive is specifically employed, there can be other forms of support, such as ceramics or the like.

A preferred diode is produced in accordance with Example 1.

EXAMPLE 1

A "p-n" junction is formed in a silicon carbide crystal in accordance with the technique described in the copending application of Vitkus, Ser. No. 589,363, filed Oct. 25, 1966, now Pat. No. 3,462,321. One edge of the resulting light-emitting diode is polished to form a smooth, light-emitting layer. A mask having an approximate size of the edge of the diode is formed of a hard metal such as tantalum or the like having a slit cut therein about ½ to 1 mil in width and having a length on the order of 40 mils. This slit may be formed by electron beam technology, cut with a photoresist technique or the like. A layer of a transparent epoxy adhesive is then spread over the edge of the diode, the diode is biased in the forward direction so that the junction emits light and the slit is aligned approximately with the light-emitting junction and held in this position until the adhesive has hardened.

EXAMPLE 2

In this technique the diode is generally prepared in the same fashion except that the light-emitting surface 30 is ground to provide a diffused light-emitting area.

Figure 3:
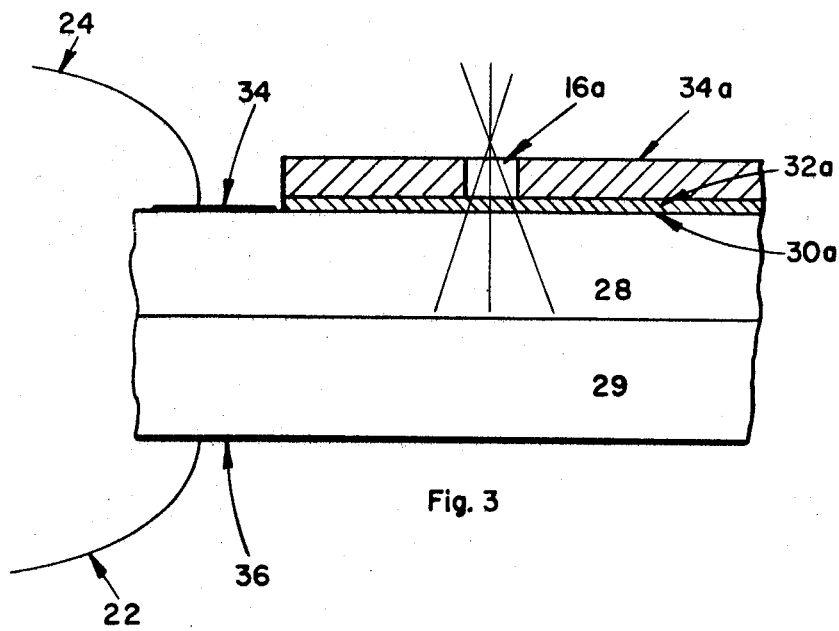
FIG. 3 is a diagrammatic, schematic view of another form of diode of the present invention.

Referring now to FIG. 3, there is shown another embodiment of the invention wherein a mask 34a is secured to an upper surface 30a of the diode by means of a suitable adhesive 32a. In this case, the mask is parallel to the "p-n" junction and the light emitted from the junction passes through the "p" layer 28, which must be translucent or transparent, and through the surface 30a and adhesive 32a and is emitted from the slit 16a. Since the light emitted from the plane of the junction is in a direction normal to the junction, it is not necessary to provide a diffused layer at 30a, and the adhesive 32a must transmit light with a minimum of absorption. Contacts 34 and 36 are provided to permit attachment of lead wires 22 and 24.

While several preferred embodiments of the invention have been described above, it should be apparent that numerous modifications may be made thereof without departing from the spirit of the invention. For example, the masks can be formed of nonmetallic materials, such as ceramics and the like; they can be formed by vapor deposition techniques, electrolysis and other manufacturing technology known to the semiconductor industry. Similarly, other electroluminescent devices such as p-p+ transition devices, heterojunctions and the like may be used.

Since certain changes can be made in the above apparatus without departing from the scope of the invention herein involved, it is intended that all matter contained in the above description shall be interpreted as illustrative and not in a limiting sense.

What is claimed is:

1. In a system for recording data such as sound on a photographic film and comprising means for creating relative movement between said film and an electroluminescent diode having a light-emitting face adjacent the film, the improvement wherein only a small portion of said face is transparent to emitted light, said portion being in the form of a predetermined design to emit light in said predetermined design, other portions of said face alongside of said predetermined design portion being substantially opaque to emitted light and comprising an apertured metallic mask cured adhesively secured to said surface by means of an insulating cured adhesive layer which electrically isolates said surface from said metallic mask, said adhesive layer being transparent to said emitted light and filling the aperture in said mask to provide a smooth outer surface.

2. The apparatus of claim 1 wherein the diode is of the type which emits light at the edge of a p-n junction therein, said edge being located at said light emitting face, and wherein said mask aperture has the form of a narrow slit with the slit being positioned so that it is substantially in alignment with said junction edge.

3. An electroluminescent junction diode having a light-emitting surface, a mask adhesively secured to said surface of said diode by means of a cured adhesive layer, said diode surface being matte to provide a diffused light emitting area, said mask having an opening in the form of a predetermined design to emit light from said diode in said predetermined design, said opening being filled by said cured adhesive layer and said adhesive filling being transparent to said emitted light to provide a smooth outer light-emitting surface.

References Cited

UNITED STATES PATENTS

| 1,835,226 | 12/1931 | Kuchenmeister | 179—100.3 |
| 2,735,049 | 2/1956 | De Forest | 317—235 |
| 3,248,670 | 4/1966 | Dill et al. | 331—94.5 |
| 3,293,513 | 12/1966 | Biard et al. | 317—237 |
| 3,330,991 | 7/1967 | Lavine | 315—94 |
| 3,341,857 | 9/1967 | Kabell | 346—107 |
| 2,776,367 | 1/1957 | Lehovec | 179—100.3 |

FOREIGN PATENTS 263,181 9/1927 Great Britain.

TERRELL W. FEARS, Primary Examiner

R. F. CARDILLO, Jr., Assistant Examiner

U.S. Cl. X.R.

313—108; 317—235; 346—107